(12) United States Patent
Zwieg et al.

(10) Patent No.: US 9,066,468 B2
(45) Date of Patent: Jun. 30, 2015

(54) FOOT PLATFORM FOR STANDING LAWN MOWER

(71) Applicant: Ariens Company, Brillion, WI (US)

(72) Inventors: Brian Zwieg, Brillion, WI (US); Paul Ferrier, Brillion, WI (US); Daniel J. Gindt, Brillion, WI (US)

(73) Assignee: Ariens Company, Brillion, WI (US)

( * ) Notice: Subject to any disclaimer, the term of this patent is extended or adjusted under 35 U.S.C. 154(b) by 443 days.

(21) Appl. No.: 13/623,227

(22) Filed: Sep. 20, 2012

(65) Prior Publication Data

US 2013/0074466 A1 Mar. 28, 2013

Related U.S. Application Data

(60) Provisional application No. 61/537,960, filed on Sep. 22, 2011.

(51) Int. Cl.
*A01D 34/74* (2006.01)
*A01D 34/64* (2006.01)
*A01D 34/82* (2006.01)
*A01D 69/03* (2006.01)

(52) U.S. Cl.
CPC ............. *A01D 34/64* (2013.01); *A01D 34/74* (2013.01); *A01D 34/82* (2013.01); *A01D 69/03* (2013.01)

(58) Field of Classification Search
CPC ..... A01D 34/64; A01D 34/82; A01D 34/001; A01D 78/20; B60D 1/143; B60D 1/145; B60D 63/065; B60D 51/02
USPC ...................... 56/14.7, 14.9, 15.4, 16.7, 15.9; 180/180, 19.1–19.3, 6.2, 6.3, 6.32, 180/6.58; 280/32.7, 32.5, 163, 35.5; 414/523, 528; 198/311
See application file for complete search history.

(56) References Cited

U.S. PATENT DOCUMENTS

| | | |
|---|---|---|
| 2,848,859 A | 8/1958 | Abel |
| 3,269,100 A | 8/1966 | Smith |
| 3,677,574 A | 7/1972 | Cyr |
| 4,577,455 A | 3/1986 | Amano et al. |
| 4,709,541 A | 12/1987 | Broman et al. |
| 4,787,646 A | 11/1988 | Kamlukin et al. |
| 4,790,399 A | 12/1988 | Middlesworth |

(Continued)

FOREIGN PATENT DOCUMENTS

JP 5097049 4/1993

OTHER PUBLICATIONS

Co-Pending U.S. Appl. No. 13/623,231, filed Sep. 20, 2012.
Co-Pending U.S. Appl. No. 13/622,650, filed Sep. 19, 2012.
Scag Power Equipment, V-Ride Operator's Manual (2010) Part No. 03259, 63 pages.

(Continued)

*Primary Examiner* — Robert Pezzuto
(74) *Attorney, Agent, or Firm* — Michael Best & Friedrich LLP

(57) ABSTRACT

A pivotable operator support platform is provided for a standing lawn mower. The pivotable operator support platform is part of a platform assembly. A deck lift foot lever is actuable by the foot of an operator on the support platform to raise the cutting deck of the lawn mower. The deck lift foot lever is pivotable with the operator support platform, and about the same pivot axis, between an operating position and a stored position. A latching assembly automatically deflects as the operator support platform is moved into the stored position, and is biased to engage a latch pin to retain the operator support platform in the stored position.

22 Claims, 11 Drawing Sheets

(56) References Cited

U.S. PATENT DOCUMENTS

| | | | |
|---|---|---|---|
| 4,828,282 | A | 5/1989 | Pinto |
| 4,878,339 | A | 11/1989 | Marier et al. |
| 4,962,636 | A | 10/1990 | Sampei et al. |
| 4,991,382 | A | 2/1991 | Scag |
| 5,004,251 | A | 4/1991 | Velke et al. |
| 5,094,078 | A | 3/1992 | Nishimura et al. |
| 5,131,483 | A | 7/1992 | Parkes |
| 5,133,176 | A | 7/1992 | Baumann et al. |
| 5,205,112 | A | 4/1993 | Tillotson et al. |
| 5,212,938 | A | 5/1993 | Zenner et al. |
| 5,230,208 | A | 7/1993 | Hess et al. |
| 5,337,543 | A | 8/1994 | Kitamura et al. |
| 5,363,635 | A | 11/1994 | White, III et al. |
| 5,381,648 | A | 1/1995 | Seegert et al. |
| 5,413,364 | A | 5/1995 | Hafendorfer |
| 5,463,853 | A | 11/1995 | Santoli et al. |
| 5,507,138 | A | 4/1996 | Wright et al. |
| 5,526,633 | A | 6/1996 | Strong et al. |
| 5,533,326 | A | 7/1996 | Goman et al. |
| 5,575,140 | A | 11/1996 | Bernes et al. |
| 5,600,944 | A | 2/1997 | Wright et al. |
| 5,615,542 | A | 4/1997 | Thorud et al. |
| 5,628,171 | A | 5/1997 | Stewart et al. |
| 5,638,667 | A | 6/1997 | Ellson et al. |
| 5,653,466 | A | 8/1997 | Berrios |
| 5,697,623 | A | 12/1997 | Bermes et al. |
| 5,765,347 | A | 6/1998 | Wright et al. |
| 5,784,870 | A | 7/1998 | Seegert et al. |
| 5,809,755 | A | 9/1998 | Velke et al. |
| 5,809,756 | A | 9/1998 | Scag |
| 5,810,371 | A | 9/1998 | Velke |
| 5,882,020 | A | 3/1999 | Velke |
| 5,894,907 | A | 4/1999 | Peter |
| 5,927,735 | A | 7/1999 | Hosoda |
| 5,964,082 | A | 10/1999 | Wright et al. |
| 5,984,031 | A | 11/1999 | Velke et al. |
| 6,000,705 | A | 12/1999 | Velke |
| 6,032,441 | A | 3/2000 | Gust et al. |
| 6,044,634 | A | 4/2000 | Velke et al. |
| 6,056,074 | A | 5/2000 | Heal et al. |
| 6,059,055 | A | 5/2000 | Velke et al. |
| 6,085,504 | A | 7/2000 | Wright et al. |
| 6,094,897 | A | 8/2000 | Velke et al. |
| 6,098,385 | A | 8/2000 | Turk |
| 6,105,348 | A | 8/2000 | Turk et al. |
| 6,125,630 | A | 10/2000 | Abend et al. |
| 6,138,446 | A | 10/2000 | Velke et al. |
| 6,155,033 | A | 12/2000 | Wians et al. |
| 6,155,034 | A | 12/2000 | Velke et al. |
| 6,182,429 | B1 | 2/2001 | Velke et al. |
| 6,185,920 | B1 | 2/2001 | Oxley |
| 6,189,304 | B1 | 2/2001 | Velke et al. |
| 6,189,305 | B1 | 2/2001 | Wright et al. |
| 6,205,753 | B1 | 3/2001 | Velke et al. |
| 6,234,495 | B1 | 5/2001 | Velke |
| 6,276,486 | B1 | 8/2001 | Velke et al. |
| 6,301,864 | B1 | 10/2001 | Damie et al. |
| 6,301,865 | B1 | 10/2001 | Velke et al. |
| 6,327,839 | B1 | 12/2001 | Velke et al. |
| 6,341,478 | B1 | 1/2002 | Sallstrom et al. |
| 6,351,929 | B1 | 3/2002 | Gust et al. |
| 6,405,515 | B1 | 6/2002 | Wright et al. |
| 6,415,587 | B1 | 7/2002 | Velke et al. |
| 6,438,930 | B1 | 8/2002 | Velke et al. |
| 6,438,931 | B1 | 8/2002 | Velke et al. |
| 6,442,917 | B1 | 9/2002 | Velke et al. |
| 6,460,640 | B1 | 10/2002 | Keagle et al. |
| 6,485,036 | B1 * | 11/2002 | Bricko .......................... 280/32.7 |
| 6,490,849 | B1 | 12/2002 | Scag et al. |
| 6,497,422 | B1 * | 12/2002 | Bellis, Jr. .................... 280/32.7 |
| 6,499,282 | B1 | 12/2002 | Velke et al. |
| 6,516,596 | B2 | 2/2003 | Velke et al. |
| 6,550,242 | B2 | 4/2003 | Abend et al. |
| 6,550,563 | B2 | 4/2003 | Velke et al. |
| 6,560,952 | B2 | 5/2003 | Velke et al. |
| 6,568,498 | B2 | 5/2003 | Abend et al. |
| 6,571,555 | B2 | 6/2003 | Abend et al. |
| 6,625,965 | B2 | 9/2003 | Wright et al. |
| 6,640,526 | B2 | 11/2003 | Velke et al. |
| 6,648,095 | B2 | 11/2003 | Abend et al. |
| 6,658,831 | B2 | 12/2003 | Velke et al. |
| 6,688,090 | B2 | 2/2004 | Velke et al. |
| 6,705,080 | B2 | 3/2004 | Abend et al. |
| 6,729,115 | B2 | 5/2004 | Bartel |
| 6,739,116 | B2 | 5/2004 | Stover et al. |
| 6,766,633 | B2 | 7/2004 | Wanie et al. |
| 6,782,964 | B1 | 8/2004 | Korthals et al. |
| 6,862,872 | B2 | 3/2005 | Wright et al. |
| 6,868,657 | B2 | 3/2005 | Bauer et al. |
| 6,868,658 | B2 | 3/2005 | Velke et al. |
| 6,877,302 | B2 | 4/2005 | Samejima et al. |
| 6,912,831 | B2 | 7/2005 | Velke et al. |
| 6,935,092 | B2 | 8/2005 | Velke et al. |
| 6,935,093 | B2 | 8/2005 | Velke et al. |
| 6,968,687 | B1 | 11/2005 | Poplawski et al. |
| 7,043,908 | B2 | 5/2006 | Irikura et al. |
| 7,047,716 | B2 | 5/2006 | Lang |
| 7,051,499 | B2 | 5/2006 | Goto et al. |
| 7,121,093 | B2 | 10/2006 | Abend et al. |
| 7,240,473 | B2 | 7/2007 | Docken et al. |
| 7,272,920 | B2 | 9/2007 | Wright et al. |
| 7,318,311 | B2 | 1/2008 | Wright et al. |
| 7,325,388 | B2 | 2/2008 | Wright et al. |
| 7,364,169 | B2 | 4/2008 | Velke et al. |
| 7,428,884 | B2 | 9/2008 | Velke et al. |
| 7,458,588 | B2 | 12/2008 | Kallevig et al. |
| 7,467,677 | B2 | 12/2008 | Barrier |
| 7,478,689 | B1 | 1/2009 | Sugden et al. |
| 7,520,114 | B2 | 4/2009 | Bergsten et al. |
| 7,523,795 | B2 | 4/2009 | Velke et al. |
| 7,527,285 | B2 | 5/2009 | Vachal |
| 7,536,858 | B2 | 5/2009 | Abend et al. |
| 7,540,135 | B2 | 6/2009 | Strope |
| 7,574,852 | B1 | 8/2009 | Loxterkamp et al. |
| 7,587,886 | B1 | 9/2009 | Sudgen |
| 7,594,379 | B2 | 9/2009 | Nicholson et al. |
| 7,596,934 | B2 * | 10/2009 | Waesche et al. ............... 56/11.9 |
| 7,607,283 | B2 | 10/2009 | Wright et al. |
| 7,611,155 | B2 | 11/2009 | Bares |
| 7,614,207 | B2 | 11/2009 | Elhardt et al. |
| 7,624,562 | B2 | 12/2009 | Kallevig et al. |
| 7,624,996 | B2 | 12/2009 | Velke et al. |
| 7,647,754 | B2 | 1/2010 | Velke et al. |
| 7,712,294 | B2 | 5/2010 | Wright et al. |
| 7,716,906 | B2 | 5/2010 | Swart |
| 7,730,577 | B2 | 6/2010 | Wood |
| 7,753,160 | B2 | 7/2010 | Velke et al. |
| 7,775,025 | B1 | 8/2010 | Coffin et al. |
| 7,857,089 | B1 | 12/2010 | Sugden et al. |
| 7,870,710 | B2 | 1/2011 | Koehn |
| 7,882,914 | B2 | 2/2011 | Scheele et al. |
| 7,908,833 | B2 | 3/2011 | Nicholson et al. |
| 7,980,569 | B2 | 7/2011 | Azure et al. |
| 8,096,374 | B1 | 1/2012 | Papke et al. |
| 8,104,552 | B2 | 1/2012 | Pakpe et al. |
| 8,141,886 | B1 * | 3/2012 | Sugden et al. ............... 280/32.5 |
| 8,250,862 | B1 | 8/2012 | Iida et al. |
| 8,479,503 | B2 | 7/2013 | Abend et al. |
| 8,561,382 | B2 * | 10/2013 | Gamble et al. ................ 56/14.7 |
| 2001/0001170 | A1 | 5/2001 | Velke et al. |
| 2006/0237240 | A1 | 10/2006 | Crumly |
| 2007/0137194 | A1 | 6/2007 | Abend et al. |
| 2007/0137918 | A1 | 6/2007 | Dong et al. |
| 2007/0144167 | A1 | 6/2007 | Abend et al. |
| 2008/0034722 | A1 | 2/2008 | Wright et al. |
| 2009/0173052 | A1 | 7/2009 | Swart |
| 2010/0126792 | A1 | 5/2010 | Kallevig |
| 2012/0000172 | A1 | 1/2012 | Papke et al. |
| 2012/0000173 | A1 | 1/2012 | Papke et al. |

\* cited by examiner

FOOT PLATFORM FOR STANDING LAWN MOWER

CROSS-REFERENCE TO RELATED APPLICATIONS

This application claims the benefit under 35 U.S.C. 119(e) of the filing date of U.S. Provisional Application No. 61/537,960, filed Sep. 22, 2011, the entire contents of which are incorporated herein by reference.

SUMMARY OF THE INVENTION

One aspect of the invention provides standing lawn mower comprising: a plurality of wheels; a frame supported by the wheels; an operator support platform pivotable between an operating position and a stored position, the operator platform supporting a standing operator of the lawn mower when the operator platform is in the operating position; a mower drive assembly supported by the frame and driving rotation of at least one of the wheels to propel the lawn mower; a cutting deck assembly including a cutting deck and at least one rotatable cutting blade beneath the cutting deck, the rotatable cutting blade rotating under the influence of the mower drive assembly; a cutting deck lift assembly actuable to raise and lower the cutting deck assembly, the cutting deck lift assembly including a deck lift foot lever; and wherein the deck lift foot lever is positioned near the operator platform and configured for actuation by a foot of the standing operator.

In some embodiments, the operator platform includes a central flat surface and angled side sections. In some embodiments, the angled side sections extend up at an angle of between about 0° and 80° with respect to the central flat surface.

In some embodiments, the lawn mower further comprises an operator platform assembly that includes the operator platform, a right pivot assembly, and a left pivot assembly; wherein the operator platform pivots about the right and left pivot assemblies between the operating and stored positions. In some embodiments, the right and left pivot assemblies each includes a pivot sleeve and a pivot pin; wherein the pivot sleeves are cylindrical with a through bore; wherein the operator platform assembly further includes pair of ears extending up from each of the right and left sides of the operator platform; wherein each ear includes a centering hole; wherein the pivot sleeves are positioned between the pairs of ears with the through bores aligned with the centering holes; and wherein the pivot pin extends through the centering holes and the through bore. In some embodiments, the lawn mower further comprises bushings received in each end of the through bores, and securing the pivot sleeves to the ears; wherein the pivot pins extend through the bushings. In some embodiments, the pivot assemblies further comprise a right side yoke and a left side yoke, both of which are rigidly mounted to the frame; and wherein the pivot pins extend through mounting holes in the yokes to pivotably secure the foot platform to the frame. In some embodiments, the deck lift foot lever and operator platform are pivotable about a common pivot axis. In some embodiments, the cutting deck lifting assembly includes an arm pivotably interconnected at one end to the deck lift foot lever with a pivot member, and pivotably interconnected at an opposite end to a foot pivot bracket; wherein at least one of the yokes includes a plate having an arcuate slot; and wherein a pivot member is movable within an arcuate slot as the deck lift foot lever and operator platform are pivoted about the common pivot axis.

In some embodiments, the foot platform assembly further includes a pivot limiting assembly that includes a stop plate and a rear cross bar; wherein the stop plate extends up from the foot platform; wherein the rear cross bar is rigidly interconnected with the frame; and wherein the stop plate abuts the rear cross bar when the operator platform is in the operating position, to resist rotation of the operator platform down from the operating position. In some embodiments, the stop plate includes dampening members that abut the rear cross member; wherein the dampening members are made of a resilient material to absorb dynamic stresses and vibrations during operation of the lawn mower to improve the comfort of the operator. In some embodiments, the mower drive assembly includes right and left integrated transaxles for driving rotation of respective right and left drive wheels; and wherein the stop plate passes between the right and left integrated transaxles as the foot platform is pivoted between the operating position and the stored position.

In some embodiments, the foot platform assembly further includes a latching assembly to retain the foot platform in the stored position. The latching assembly may include a latch pin on the foot platform, a latch arm interconnected to the frame, and a biasing member; the latch pin being engaged by the latch arm to retain the foot platform in the stored position. In some embodiments, the latch arm includes a cam surface and a latch slot; wherein the latch pin engages the cam surface and deflects the latch arm as the foot platform is pivoted into the stored position; wherein the biasing member moves the latch pin into the latch slot upon the latch pin becoming aligned with the latch slot; and wherein positioning of the latch pin in the latch slot prevents the foot platform from pivoting out of the stored position.

Another aspect of the invention provides an operator support platform assembly for a standing lawn mower, the operator support platform assembly supporting a standing operator of the lawn mower when the operator platform is in an operating position, the operator support platform assembly comprising: a right pivot assembly; a left pivot assembly; an operator platform pivoting about a pivot axis on the right and left pivot assemblies between the operating position and a stored position; and a deck lift foot lever mounted to one of the right and left pivot assemblies and pivotable about the pivot axis between an operating position and a stored position, the deck lift foot lever being actuated by a foot of the operator standing on the operator platform to raise the height of a cutting deck of the lawn mower.

In some embodiments, the right and left pivot assemblies each include a pivot pin; and wherein the deck lift foot lever pivots about one of the pins. In some embodiments, the operator support platform assembly further comprises a pivot limiting assembly that includes a stop plate and a rear cross bar; wherein the stop plate extends up from the foot platform; wherein the rear cross bar is rigidly interconnected with a frame of the lawn mower; and wherein the stop plate abuts the rear cross bar when the operator platform is in the operating position, to resist rotation of the operator platform down from the operating position. In some embodiments, the stop plate includes at least one dampening member that abuts the rear cross member; wherein the dampening member is made of a resilient material to absorb dynamic stresses and vibrations during operation of the lawn mower to improve the comfort of the operator. In some embodiments, the lawn mower includes right and left integrated transaxles for driving rotation of respective right and left drive wheels; and wherein the stop plate passes between the right and left integrated transaxles as the foot platform is pivoted between the operating position and the stored position. In some embodiments, the operator support platform assembly further comprises a latch assembly including a biasing member, a latch arm including a latch slot, and a latch pin; wherein movement of the operator platform into the stored position brings the latch pin into abutment with the latch arm; wherein the latch pin deflects the latch arm against a biasing force in the biasing member; wherein the biasing member moves the latch pin into the latch slot upon the latch pin becoming aligned with the latch slot; and wherein positioning of the latch pin in the latch slot prevents the foot platform from pivoting out of the stored position.

BACKGROUND OF THE INVENTION

The present invention relates to lawn mowers and more particularly to standing ride-on lawn mowers, and more specifically to a foot platform arrangement for such a lawn mower.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
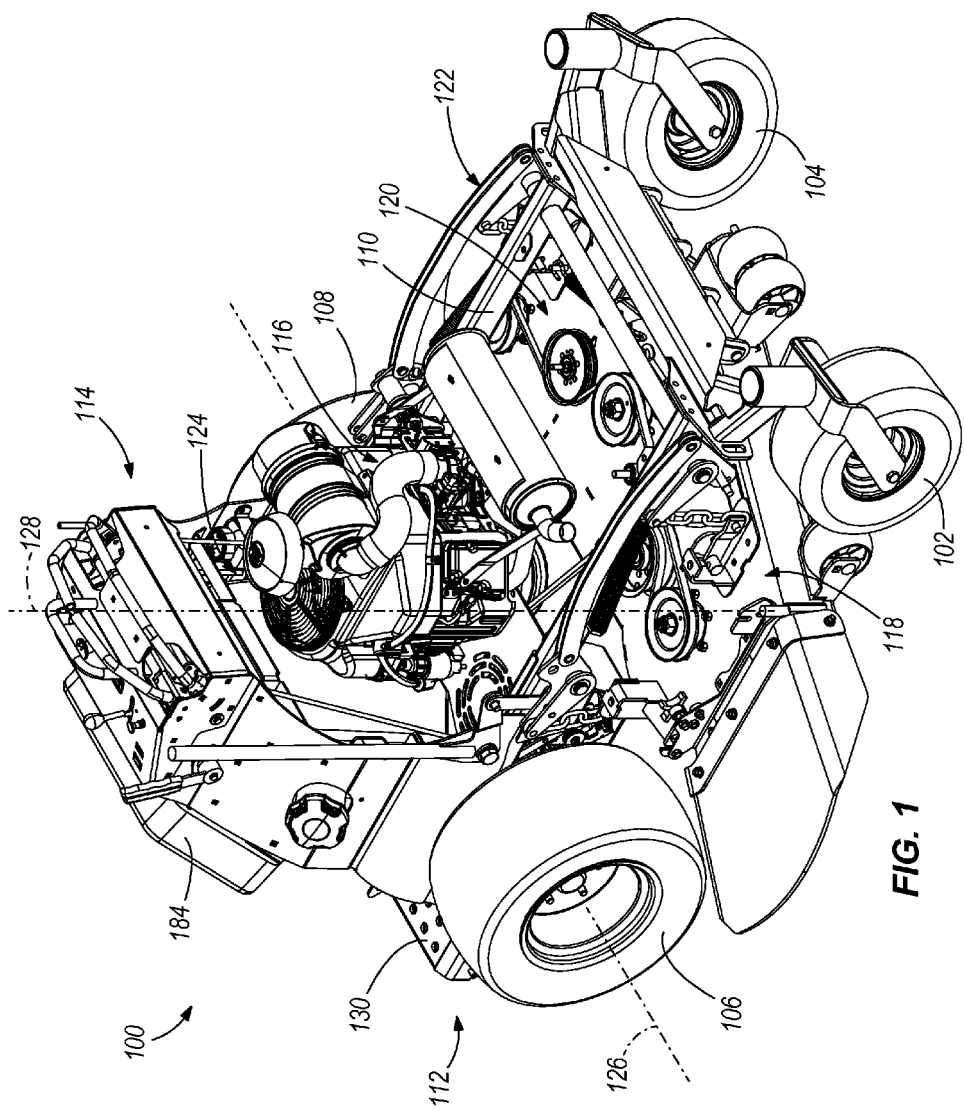
FIG. 1 is a front perspective view of a lawn mower.
Figure 2:
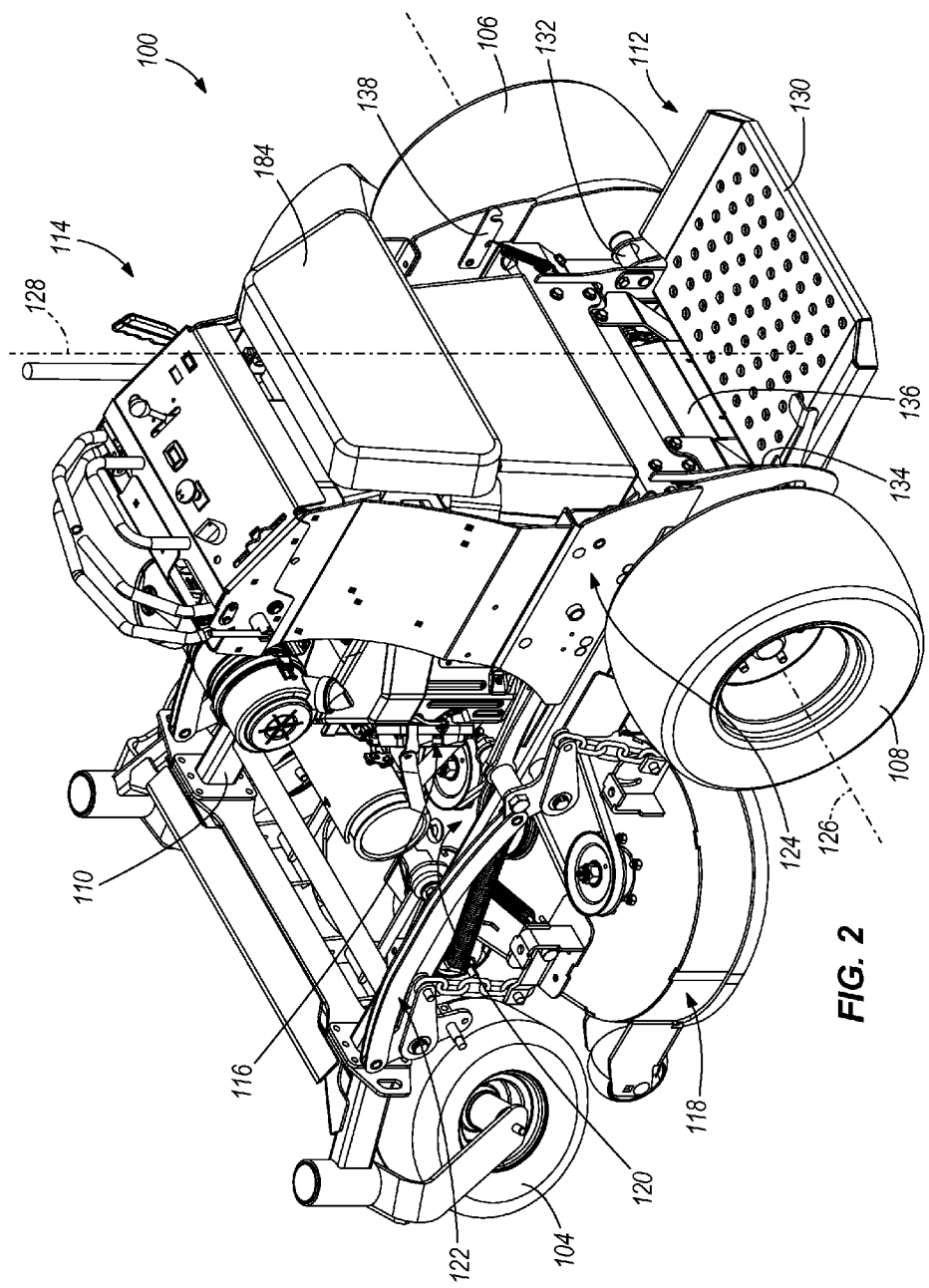
FIG. 2 is a rear perspective view of the lawn mower.

FIGS. 1 and 2 illustrate a lawn mower 100 embodying the present invention. The lawn mower 100 includes a right front wheel 102, a left front wheel 104, a right rear drive wheel 106, a left rear drive wheel 108, a frame 110, an operator platform assembly 112, a control tower 114, a mower drive assembly 116, a cutting deck assembly 118, a cutting deck transmission assembly 120, a cutting deck lift assembly 122, and a height of cut assembly 124. The figures illustrate a standing ride-on lawn mower 100, which is a lawn mower on which the operator stands rather than sits. Various features of this mower 100, including the mower drive assembly 116, the cutting deck lift assembly 122, and the height of cut assembly 124 are applicable to other types of lawn mowers, including walk behind lawn mowers and sitting ride-on lawn mowers.

For the purposes of the present specification, all spatial and directional terms shall, unless specifically stated otherwise, refer to space and direction as perceived by an operator of the lawn mower 100 in the lawn mower's intended operational orientation, moving over flat, horizontal ground. In ordinary operation, the lawn mower 100 is intended to be oriented with the front and rear wheels 102, 104, 106, 108 in contact with the ground and an operator standing on the operator platform assembly 112 facing toward the front wheels 102, 104. Consequently, the term "forward" and variations thereon shall mean in a direction parallel to the direction from the rear wheels 106, 108 toward the front wheels 102, 104. The term "front" and variations thereon shall mean positioned further in the forward direction than an element being compared. The term "reverse" and variations thereon shall mean in a direction parallel to the direction from the front wheels 102, 104 toward the rear wheels 106, 108. The term "rear" and variations thereon shall mean positioned further in the reverse direction than an element being compared. The terms "right," "left," and variations thereon shall be in reference to the respective right and left as viewed by a forward-looking operator. The terms "up," "down" and variations thereon shall be used as from the perspective of an operator standing on the operator platform assembly 112. The terms "above" and "over" shall mean intersecting a comparatively higher horizontal plane, and the terms "directly above" and "directly over" shall mean intersecting a comparatively higher horizontal plane and intersecting a common vertical line. The terms "below" and "under" shall mean intersecting a comparatively lower horizontal plane, and the terms "directly below" and "directly under" shall mean intersecting a comparatively lower horizontal plane and intersecting a common vertical line. Elements that are "directly above" or "directly below" other elements are also "above" or "below" the other elements, but the opposite is not necessarily true.

The right and left front wheels 102, 104 in the illustrated embodiment are of a variety commonly called "caster wheels." The right and left front wheels 102, 104 are passive, meaning that they are not driven under power. The right and left front wheels 102, 104 rotate about horizontal axes of rotation. The right and left front wheels 102, 104 are mounted to the frame 110 with an arrangement that permits the right and left front wheels 102, 104 to swivel with respect to the frame 110 about vertical axes to accommodate turning and rotating of the lawn mower 100. In some embodiments, the right and left front wheels 102. 104 are not passive, but instead can be actively steered by the operator.

The right and left rear drive wheels 106, 108 in the illustrated embodiments are driven under the influence of the mower drive assembly 116, as will be discussed in more detail below. As will be discussed, the right and left rear drive wheels 106, 108 in the illustrated embodiment are capable of rotating independent of one another in forward and reverse directions to cause forward, reverse, and turning movement of the lawn mower 100. The right and left drive wheels 106, 108 rotate about a common horizontal axis of rotation 126.

When the right and left drive wheels 106, 108 rotate in opposite directions (i.e., one forward and one reverse) at the same speed, the lawn mower 100 rotates about a zero-radius turning axis 128, which may also be referred to as a zero-turn axis or ZT axis. The ZT axis 128 is a vertical axis that intersects the horizontal axis of rotation 126 midway between the right and left rear drive wheels 106, 108. The intersection of the vertical ZT axis 128 and the horizontal axis of rotation 126 may be referred to as the "midpoint" between the right and left rear drive wheels 106, 108. The vertical plane that includes the horizontal axis of rotation 126 and the ZT axis 128 may be referred to as the "reference plane 126, 128."

The frame 110 is supported by the right and left front wheels 102, 104 and the right and left rear drive wheels 106, 108. The other systems of the lawn mower 100 (i.e., the operator platform assembly 112, the control tower 114, the mower drive assembly 116, the cutting deck assembly 118, the cutting deck transmission assembly 120, the cutting deck lift assembly 122, and the height of cut assembly 124) are supported by the frame 110.

Figure 3:
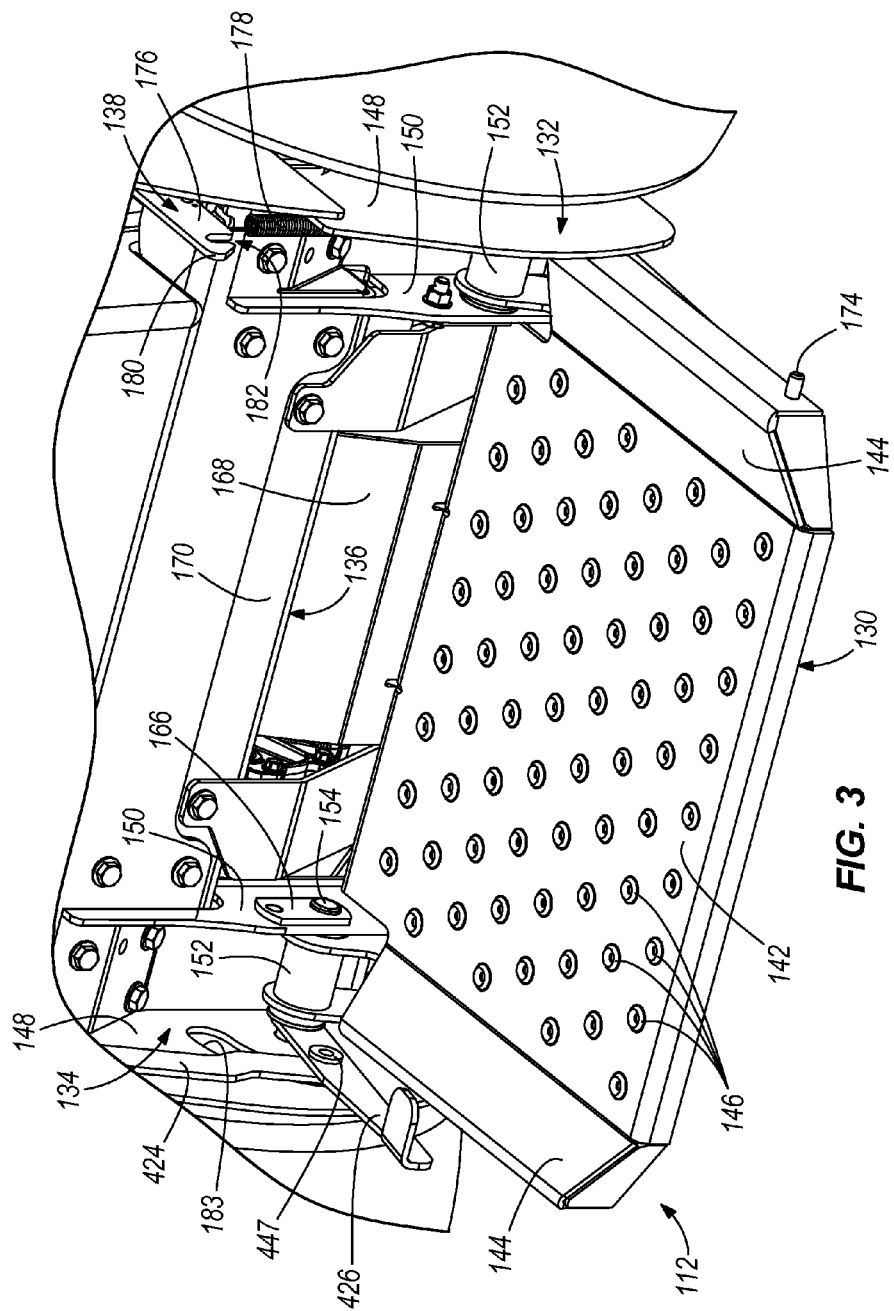
FIG. 3 is a perspective view of an operator platform assembly of the lawn mower of FIG. 1.
Figure 4:
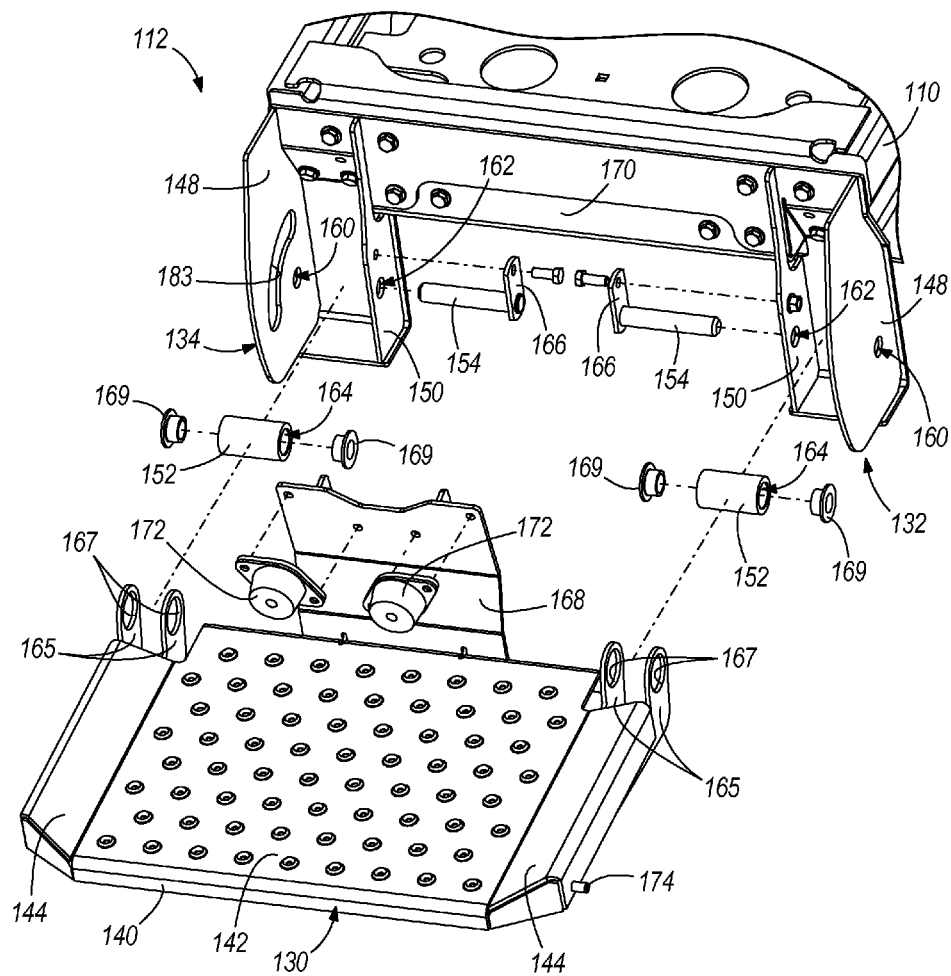
FIG. 4 is an exploded perspective view of the operator platform assembly.
Figure 5:
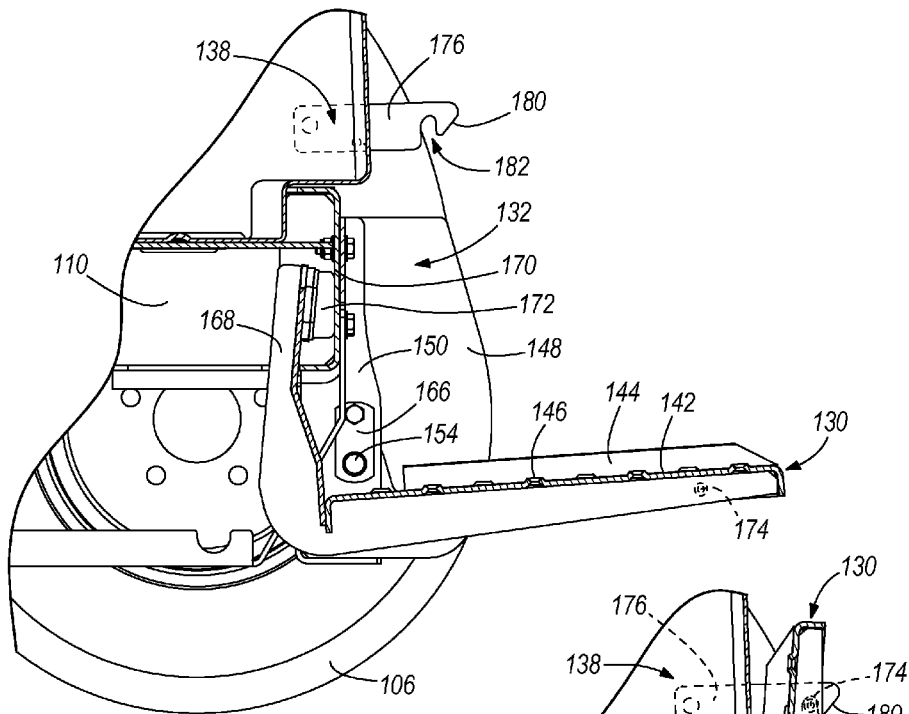
FIG. 5 is a section view of the operator platform assembly in an operating position.
Figure 6:
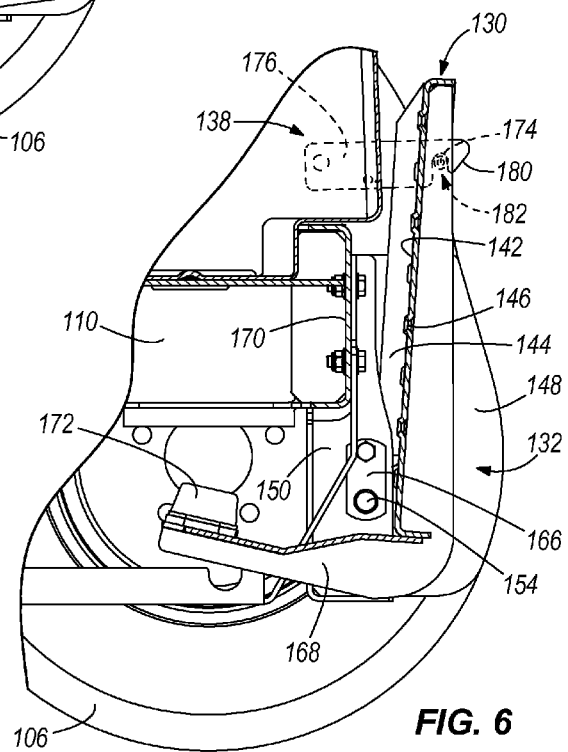
FIG. 6 is a section view of the operator platform assembly in a stored position.

With reference to FIGS. 3 and 4, the operator platform assembly 112 includes an operator platform 130, a right pivot assembly 132, a left pivot assembly 134, a pivot limiting assembly 136, and a latch assembly 138. The operator platform assembly 112 is pivotable between an operating position in which it may be said to be "pivoted down" as illustrated in FIG. 5, and a stored position in which it may be said to be "pivoted up" as illustrated in FIG. 6. Except as specifically noted, the operator platform assembly 112 will be discussed below with reference to its operating position.

The operator platform 130 includes a plate 140 that has a central flat surface 142 and angled side sections 144. The operator stands on the operator platform 130 during operation of the lawn mower 100. For the purposes of the present specification, the term "operator zone" will be used to mean all areas of the lawn mower 100 that are accessible by an operator of the lawn mower 100 standing on the operator platform 130 during ordinary operation of the lawn mower 100.

The central flat surface 142 includes slip-resistant features 146, such as bumps or a rough surface treatment to resist slipping of the operator's feet. The angled side sections 144 are positioned on the right and left sides of the central flat surface and 142 extend up at angle of between about 0° and 80°, and in some configurations between about 10° and 80°, with respect to the central flat surface 142. The angled side sections 144 give the operator tactile feedback as to the operator's foot position on the operator platform 130. The operator platform 130 (or, more specifically, the central flat surface 142) is pivotable between being generally horizontal when in the operating position (FIG. 5) and generally vertical when in the stored position (FIG. 6).

The right and left pivot assemblies 132 and 134 are mirror images of each other. Each pivot assembly 132, 134 includes an outer bracket 148, an inner bracket 150, a pivot sleeve 152, and a pivot pin 154. The terms "outer" and "inner" refer to the brackets' positions along the horizontal axis of rotation 126 of the rear drive wheels 106 and 108 with respect to the midpoint between the drive wheels 106 and 108. The outer bracket 148 is axially further from the midpoint than the inner bracket 150 is. The outer and inner brackets 148, 150 include vertical planar sections that are parallel to each other, and in this regard may be characterized as a yoke for the pivot pin 154.

The outer bracket 148 is mounted to the side of the frame 110 and extends down between the drive wheel 106, 108 and the operator platform 130. The outer bracket 148 reduces access of the operator's foot, pants, or other body part or clothing to the rotating drive wheel 106, 108 to reduce the likelihood of the operator or the operator's clothing from coming into contact with the drive wheel 106, 108 while the operator is standing on the operator platform 130. In this regard, the outer bracket 148 may be termed a wheel blocking bracket. The outer bracket 148 includes a pivot pin mounting hole 160. The inner bracket 150 is also mounted to the frame 110 and extends down. The inner bracket 150 includes a pivot pin mounting hole 162 that aligns with the pivot pin mounting hole 160 in the outer bracket 148.

The pivot sleeve 152 includes a through bore 164 and is a cylindrical member rigidly mounted to the operator platform 130. The pivot sleeve 152 could be made integrally with the operator platform 130 or could be provided separately and rigidly joined or affixed to the operator platform 130. In the illustrated embodiment, the pivot sleeves 152 are positioned between ears 165 that extend up from the forward ends of the angled side sections 144 of the operator platform 130. The ears 165 are spaced such that each pair of ears 165 fits between the outer and inner brackets 148, 150. The ears 165 include centering holes 167 that align with the through bore 164.

Bushings 169 that have a small diameter portion and a wide flange secure the pivot sleeves 152 to the ears 165. The small diameter portions of the bushings 169 extend through the centering holes 167 and are press fit into the through bore 164. The flanges of the bushings 169 sit against the away-facing surfaces of the ears 165. The flange diameter is larger than the diameter of the centering holes 167. The bushings 169 include a through bore.

The pivot pin 154 extends through the pivot pin mounting holes 160, 162, the bushings 167, and the through bore 164 to pivotally interconnect the operator platform 130 to the outer and inner brackets 148, 150 (and thereby to the frame 110). A retaining bracket 166, snap ring, or other means for preventing the pivot pin 154 from axial movement is attached to the pivot pin on the away-facing surface of the inner bracket 150. The outer end of the pivot pin 154 is secured from axial movement with a nut or other fastener. The pivot sleeves 152 and bushings 169 are free to rotate on the pivot pins 154, such that the operator platform 130 is pivotable between the operating position and the stored position about the pivot pins 154.

The pivot limiting assembly 136 includes a stop plate 168, a rear cross bar 170, and a plurality of dampening members 172. The stop plate 168 is mounted to the front edge of the operator platform 130, between the inner brackets 150 of the pivot assemblies 132, 134. The stop plate 168 extends at a right angle to the operator platform 130, and is therefore vertical when the operator platform assembly 112 is in the operating position and horizontal when the operator platform assembly 112 is in the stored position.

The plurality of dampening members 172 are mounted to the rear facing surface of the stop plate 168. The dampening members 172 are made of a resilient material such as rubber, to absorb vibrations and shock.

The rear cross bar 170 is mounted to the rear end of the frame 110. The dampening members 172 come into contact with the forward-facing side of the rear cross bar 170 when the operator platform assembly 112 is in the operating position. In operation, the weight of the operator is downwardly directed on the operator platform 130, which causes the operator platform 130 to pivot down on the pivot pins 154. Downward pivoting of the operator platform 130 is resisted by the dampening members 172 of the stop plate 168 bearing against the rear cross bar 170. As the lawn mower 100 moves over bumpy terrain, some of the dynamic stresses and vibrations that are transferred to the lawn mower 100 are absorbed by the dampening member 172 to improve the comfort of the operator. Stated another, way, the dampening members 172 provide suspension for the operator standing on the operator platform 130, which reduces the amplitude of vibration and impact loading that is transmitted to the operator as a result of operating the lawn mower 100.

The latching assembly 138 includes a latch pin 174, a latch arm 176, and a biasing member 178. The latch pin 174 is rigidly affixed to the operator platform 130 and extends to one side (the right side in the illustrated embodiment). The latch arm 176 includes a cam surface 180 and a latch slot 182, and is pivotably mounted to the outer bracket 148 or to another bracket above the outer bracket 148 that is mounted to the frame 110. The illustrated biasing member 178 is a linearly acting spring, but in other embodiments it may be a torsion spring. The biasing member 178 biases the latch arm 176 toward an engaged position ("down" in the illustrated embodiment).

Upon pivoting the operator platform 130 into the stored position, the latch pin 174 engages the cam surface 180 of the latch arm 176 and pivots the latch arm 176 against the biasing force of the biasing member 178 (i.e., pivots the latch arm "up" in the illustrated embodiment). Continued movement of the operator platform 130 toward the stored position moves the latch pin 174 into alignment with the latch slot 182. Upon alignment of the latch pin 174 with the latch slot 182, the biasing force of the biasing member 178 pivots the latch arm 176 down, such that the latch pin 174 is captured within the latch slot 182.

The engagement of the latch pin 174 by the latch arm 176 resists pivotal movement of the operator platform 130 from the stored position toward the operating position. This is often desirable during transportation or storage of the lawn mower 100 because it reduces the overall length of the lawn mower to save space. The operator platform 130 is released from the stored position by lifting the latch arm 176 (e.g., by engagement of one's finger against the cam surface 180 on the latch arm 176) such that the latch pin 174 is free from the latch slot 182 so the operator platform 130 can pivot down toward the operating position.

The outer bracket 148 of the left pivot assembly 134 includes an arc-shaped slot 183 to accommodate a fastener 447 that pivotably interconnects a slotted arm 424 and a deck lift foot lever 426, which will be described in greater detail below.

As illustrated, the operator platform 130 is positioned at least partially behind the right and left rear drive wheels 106 and 108. The pivot pin 154 is positioned behind and below the common horizontal axis of rotation 126 of the drive wheels 106 and 108. The entirety of the operator platform 130 is behind the common horizontal axis of rotation 126 of the drive wheels 106 and 108. In the operating position, the operator platform 130 is below a plane containing the engine deck 210.

Figure 7:
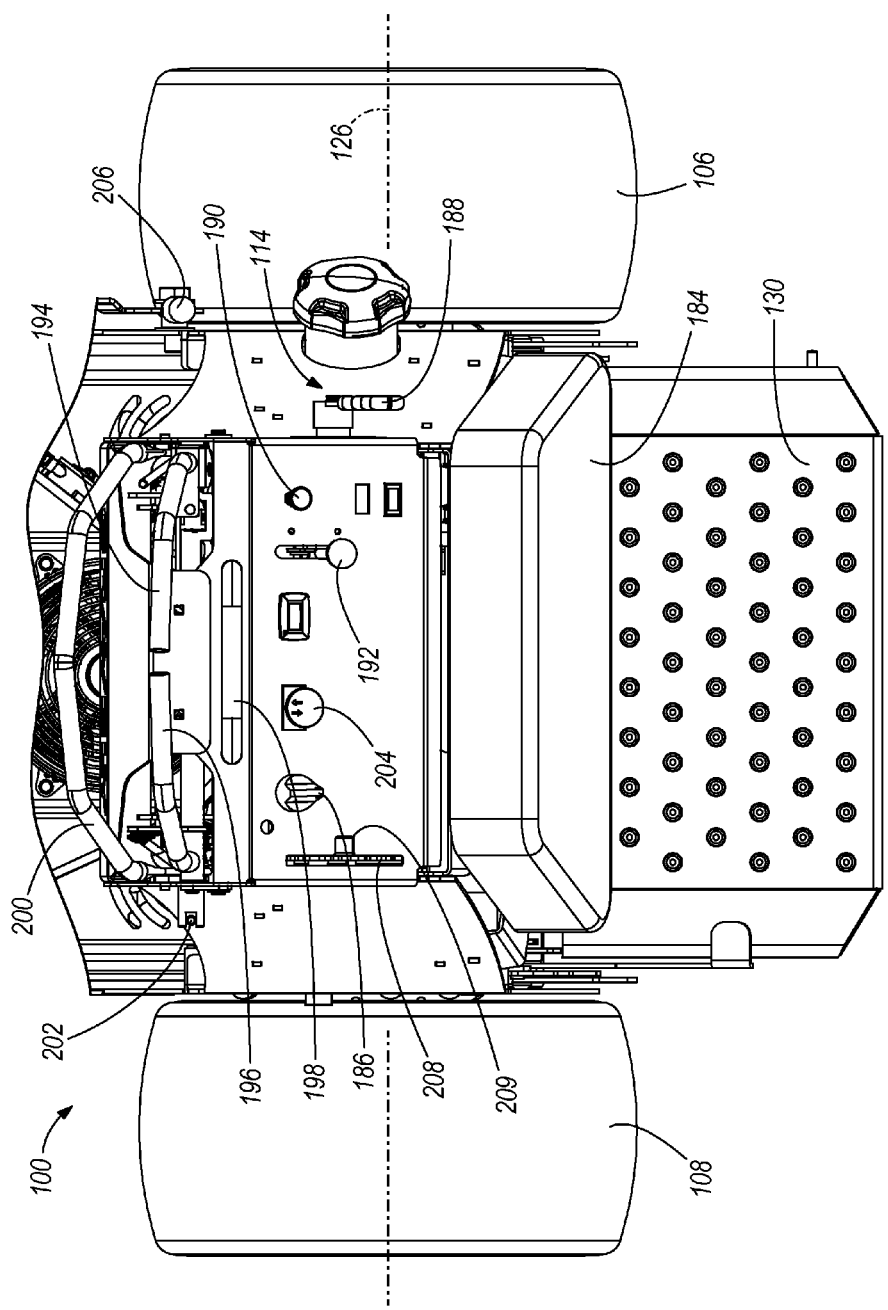
FIG. 7 is a top view of a portion of the lawn mower.

Referring to FIG. 7, the control tower 114 extends vertically from the frame 110 in front of the operator platform 130. Mounted to a rear-facing side of the control tower 114 is a cushion 184 against which a forward-leaning operator rests during operation of the lawn mower 100. The control tower 114 includes the following controls, all of which are in the operator zone: an ignition switch 186, a blade engagement control 188, a choke 190, an engine speed control 192, a right control arm 194, a left control arm 196, a reverse hard stop 198, a forward hard stop 200, a forward hard stop lock 202, an interlock 204, a deck lift hand lever 206, a height of cut selector 208, and a height of cut indicator 209. In the illustrated embodiment, at least some of the controls are located or locatable forward of the reference plane 126, 128 (i.e., a plane perpendicular to FIG. 7 and including the axis of rotation 126), but in an alternative preferred embodiment, at least the reverse hard stop 198, the right control arm 194, the left control arm 196, and the forward hard stop 200 are all moved rearward of the reference plane 126, 128.

Figure 8:
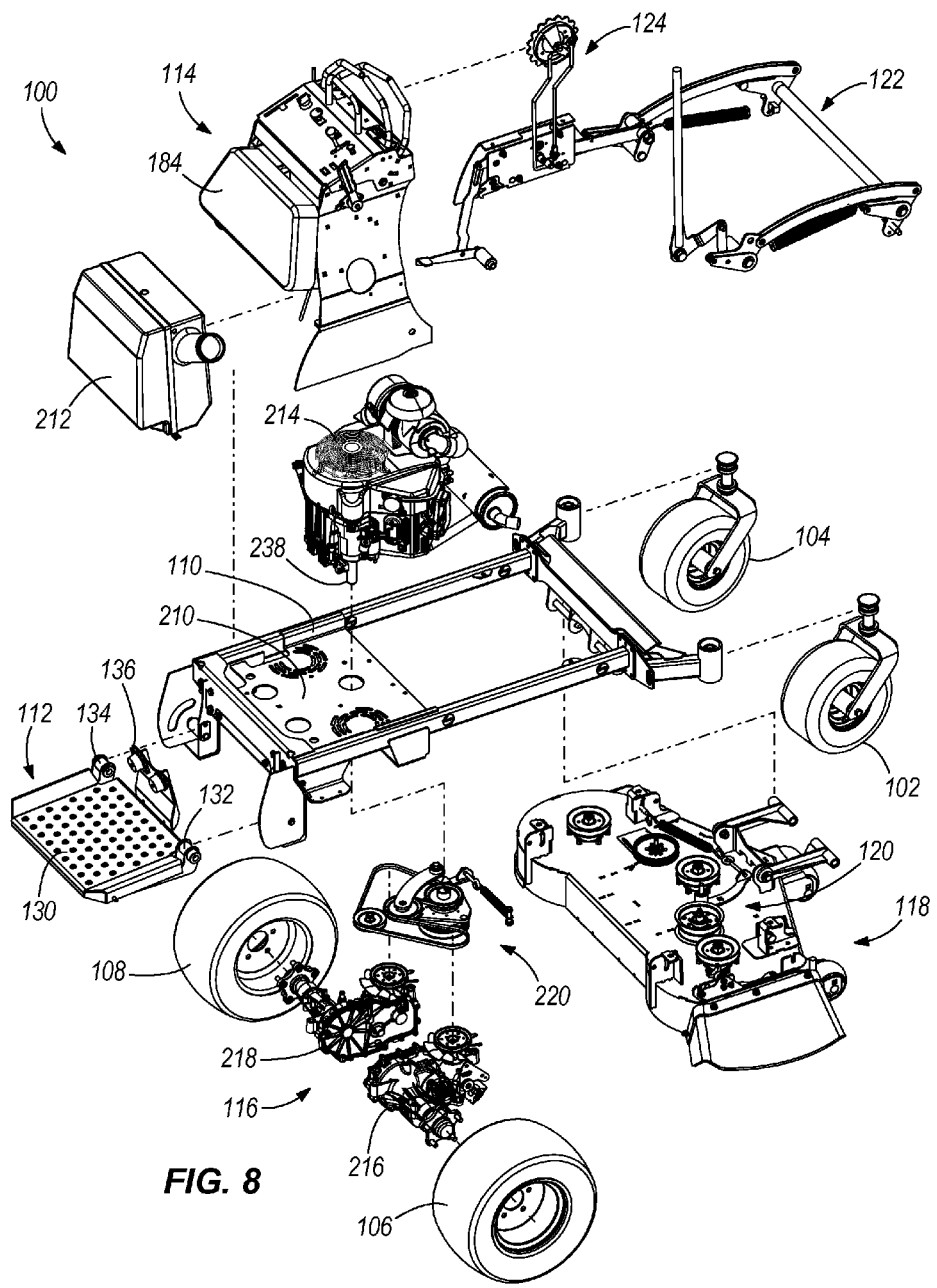
FIG. 8 is an exploded rear perspective view of the lawn mower.

FIG. 8 illustrates the mower drive assembly 116, which includes an engine deck 210, a fuel source 212, an engine 214, a right integrated transaxle 216, a left integrated transaxle 218, and a drive transmission assembly 220. The engine deck 210 is above the operator platform 130 when the operator platform 130 is in the operating position. The engine 214, acting through the drive transmission assembly 220, drives a pump in each of the right and left integrated transaxles 216, 218. The engine 214 also drives operation of the cutting deck transmission assembly 120 to cause cutting blades in the cutting deck assembly 118 to rotate and cut grass or other vegetation.

The right and left control arms 194, 196 are interconnect to the right and left integrated transaxles 216, 218 to control the speed and direction of rotation of the respective right and left rear drive wheels 106, 108. The right and left control arms 194, 196 have a neutral position in which they do not cause any rotation of the right and left rear drive wheels 106, 108. When the right and left control arms 194, 196 are pushed forward from the neutral position by the operator, the respective right and left rear drive wheels 106, 108 rotate in a forward direction at a speed proportional to the degree of forward movement of the control arms 194, 196. When the right and left control arms 194, 196 are pulled rearward from the neutral position by the operator, the respective right and left rear drive wheels 106, 108 rotate in a reverse direction (opposite the forward direction) at a speed proportional to the degree of rearward movement of the control arms 194, 196. When one of the control arms is pushed forward and the other is pulled rearward, one of the drive wheels rotates in the forward direction and the other rotates in the reverse direction, giving rise to rotation of the lawn mower 100 about the ZT axis 128.

The stop plate 168 of the operator platform assembly 112 moves or passes between the right and left integrated transaxles 216, 218 as the foot platform is pivoted between the operating position (FIG. 5) and the stored position (FIG. 6).

Referring now to FIG. 7, the reverse hard stop 198 provides a fixed frame of reference for the operator when manipulating the control levers 194, 196. The operator's hands and thumbs may rest on the reverse hard stop 198 while the operator's fingers pull one or both of the control arms 194, 196 rearward (i.e., in the reverse direction). Squeezing the control arms 194, 196 against the reverse hard stop 198 results in maximum reverse speed for the lawn mower 100. The operator's hands are less prone to bouncing or moving unintentionally due to the terrain when the operator's hands and fingers rest on the reverse hard stop 198.

The forward hard stop 200 is adjustable and locked in place by the forward hard stop lock 202. The forward hard stop 200 may be pivoted forward or rearward into a desired position by disengaging or unlocking the forward hard stop lock 202, pivoting the forward hard stop 200 to a desired position, and engaging or locking the forward hard stop lock 202. Once the forward hard stop 200 is set, a desired maximum forward speed has been established for the lawn mower 100. By squeezing the control arms 194, 196 against the forward hard stop 200, the operator achieves the desired maximum forward speed. When locked in place, the forward hard stop 200 is fixed with respect to the control tower 114 to provide a stable and fixed resting place for the operator's hands. The operator's hands and fingers rest on the forward hard stop 200, while the operator's thumbs manipulate the control arms 194, 196 in the forward direction. The forward hard stop 200 provides a frame of reference for the relative speed being requested of each drive wheel 106, 108. The operator's hands are less prone to bouncing or moving unintentionally due to the terrain when the operator's hands and fingers rest on the forward hard stop 200.

Referring again to FIG. 8, in the illustrated embodiment, the fuel source 212 is a gas tank that contains gasoline for use by the engine 214. The gas tank can include a primary tank and a back-up tank. The fuel source 212 is mounted to the engine deck 210. In the illustrated embodiment, the engine 214 is supported by the engine deck 210 and includes a power take off ("PTO") shaft 238 extending vertically down through the engine deck 210. The engine 214 also includes a PTO bearing that supports the PTO shaft 238 for rotation about a vertical axis of rotation. Although the illustrated embodiment includes an internal combustion engine 214 and a gasoline tank 212 as the prime mover and fuel source, respectively, other embodiments may include alternative prime movers and suitable fuel sources for such alternative prime movers. Examples of alternative prime movers and fuel sources include a hybrid engine and a source of natural gas or gasoline, an electric motor and batteries, and a fuel cell and hydrogen tank.

Figure 9:
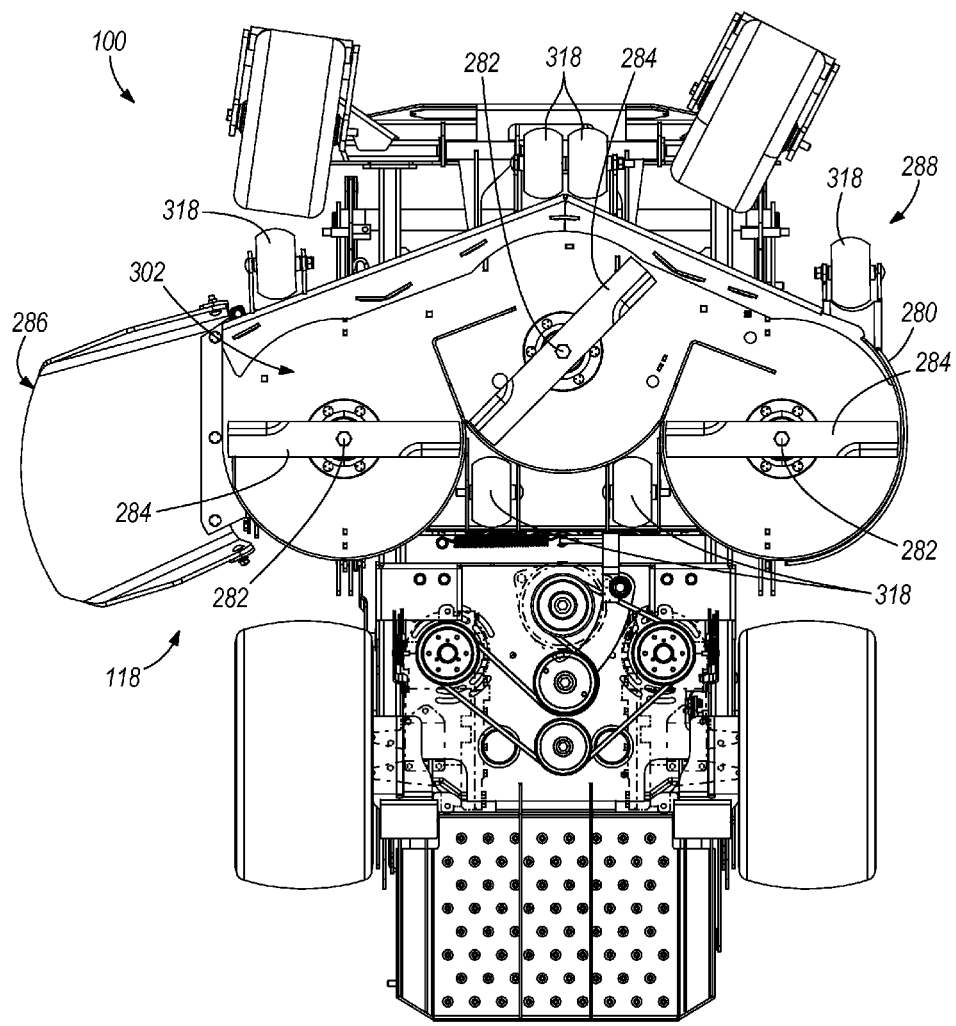
FIG. 9 is a bottom view of a cutting deck assembly of the lawn mower.
Figure 10:
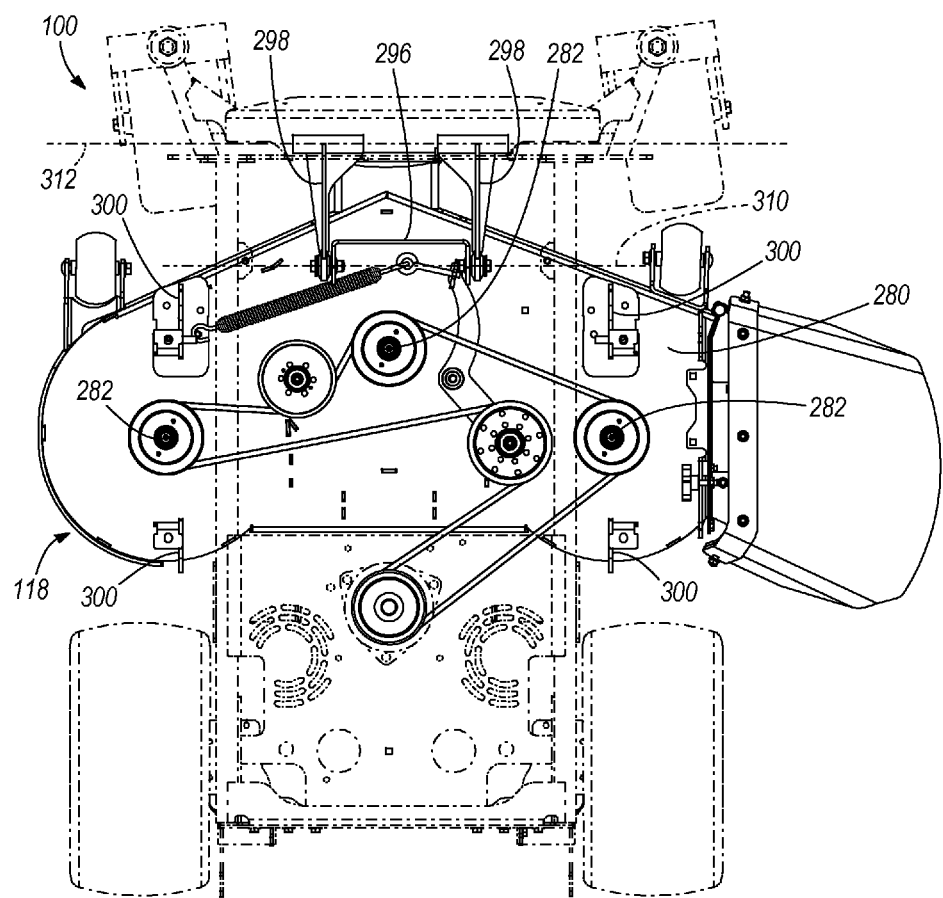
FIG. 10 is a top view of the cutting deck assembly and a cutting deck transmission assembly of the lawn mower.

As illustrated in FIGS. 9 and 10, the cutting deck assembly 118 includes a cutting deck 280, three spindles 282, three cutting blades 284, a discharge assembly 286, and an anti-scalp system 288. The cutting deck 280 includes a front mounting bracket 296, two front mounting arms 298, and four connection brackets 300. A cutting space 302 is defined below the cutting deck 280.

The front mounting bracket 296 is rigidly mounted on top of the cutting deck 280. The front mounting arms 298 each include a rear end and a front end. The rear end of each mounting arm 298 is pivotally interconnected to the front mounting bracket 296 about a horizontal pivot axis 310. The front end of each mounting arm 298 is pivotally interconnected to the front of the frame 110 about a horizontal pivot axis 312. The cutting deck 280 can pivot about both horizontal pivot axes 310 and 312 as the cutting deck 280 raises and lowers with respect to the frame 110. The four connection brackets 300 are rigidly mounted on top of the cutting deck 280. Each connection bracket 300 provides a horizontal pivot point (i.e., a hole) for interconnection with the cutting deck lift assembly 122, which will be discussed in more detail below.

The spindles 282 extend vertically through the top wall of the cutting deck 280, into the cutting space 302. Each of the spindles 282 is supported for rotation about a vertical axis of rotation. The cutting blades 284 have cutting edges at both ends and are designed to be mounted at their center points to a spindle 282. The blades 284 rotate under the deck to cut vegetation (e.g., grass). Cut vegetation is referred to as "clippings". The clippings then move, under the influence of air currents created by the rotating cutting blades 284 out the discharge assembly 286. The discharge assembly 286 may be pivotable about a horizontal axis to pivot up, and may include a flexible, resilient material that resiliently deflects upon bumping against an object.

The anti-scalp system 288 includes six passive wheel assemblies 318. Each of the wheel assemblies 318 includes a bracket mounted to the side of the cutting deck, and a wheel that is rotatable within the bracket. Four of the passive wheel assemblies 318 are mounted to the front of the cutting deck 280, and two of the passive wheel assemblies 318 are mounted to the rear of the cutting deck 280. The anti-scalp system 288 defines a minimum spacing between the cutting deck 280 and the ground over which the lawn mower 100 travels.

The cutting deck 280 is similar to that used on the Gravely Pro-Stance Float Deck model numbers 994109 and 994110 manufactured by Ariens Company of Brillion, Wis. Different cutting decks of various widths can be used. Typical widths include 48 inches and 52 inches.

Figure 11:
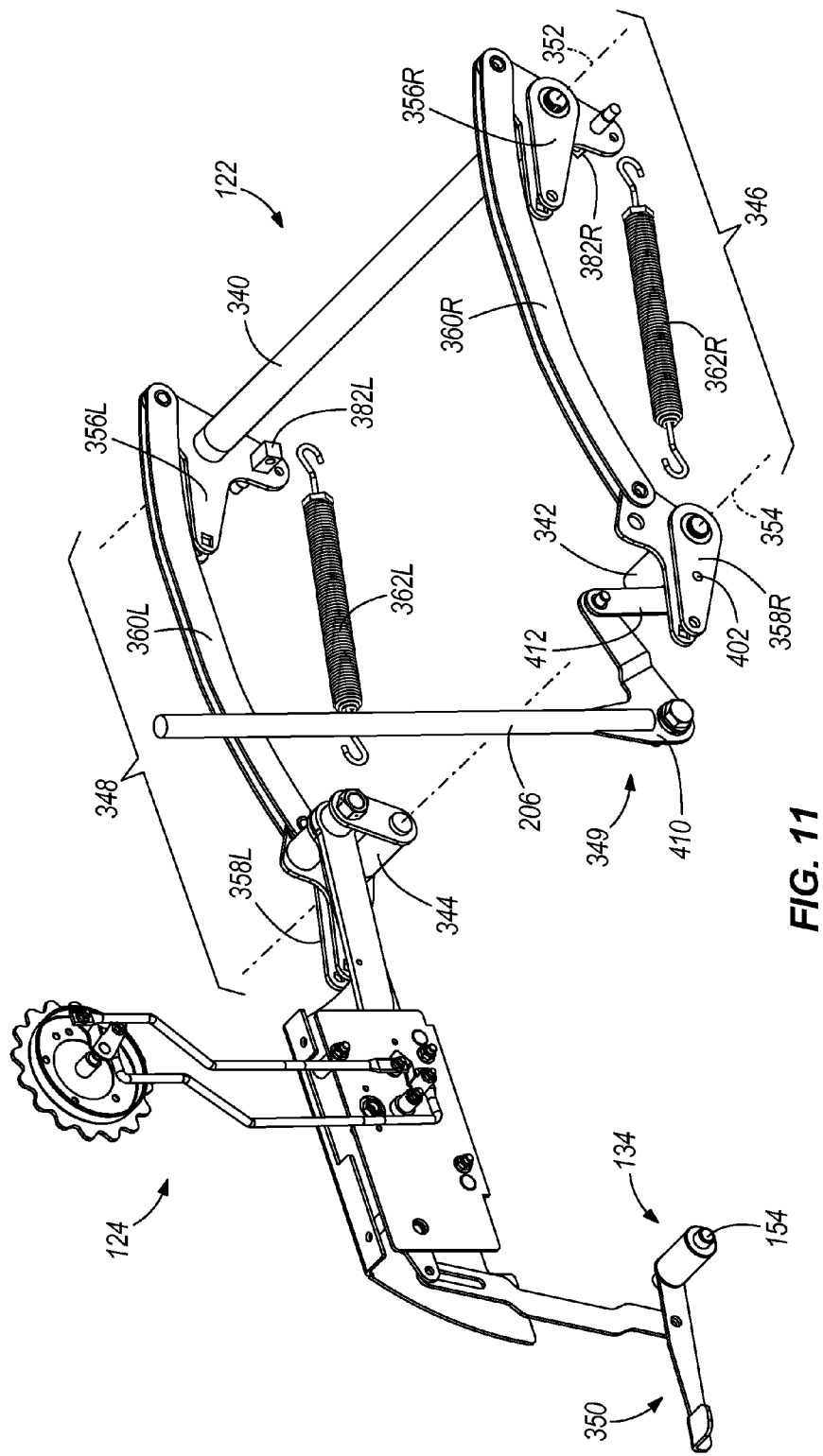
FIG. 11 is a perspective view of a deck lift assembly and height-of cut assembly of the lawn mower.

With reference to FIG. 11, the cutting deck lift assembly 122 includes a front pivot shaft 340, a right rear pivot shaft 342, a left rear pivot shaft 344, a right lift assembly 346, a left lift assembly 348, a hand actuator assembly 349, and foot actuator assembly 350.

The front pivot shaft 340 extends across the front of the frame 110 and through side rails of the frame 110. The front pivot shaft 340 includes right and left ends that extend beyond the right and left sides of the frame 110. The front pivot shaft 340 defines a longitudinal axis 352 that may also be termed the front deck lift axis. Journal bearings support the front pivot shaft 340 at each side of the frame 110 and the front pivot shaft 340 is rotatable with respect to the frame 110 about the front deck lift axis 352.

The right and left rear pivot shafts 342, 344 are mounted in cantilever fashion to the frame 110, rearward of the front pivot shaft 340 and generally above the rear portion of the cutting deck assembly 118. The right and left rear pivot shafts 342, 344 extend beyond the right and left sides of the frame, respectively. The right and left rear pivot shafts 342, 344 define longitudinal axes that are collinear with each other. The line that includes the longitudinal axes of the right and left rear pivot shafts 342, 344 may be termed a rear deck lift axis 354. The right and left rear pivot shafts 342, 344 are supported by journal bearings in the frame 110 to rotate or pivot about the rear deck pivot axis 354.

The right lift assembly 346 includes a right front lifting bracket assembly 356R, a right rear lifting bracket assembly 358R, a right synchronizing arm 360R, and a right spring 362R. The left lift assembly 348 includes a left front lifting bracket assembly 356L, a left rear lifting bracket assembly 358L, a left synchronizing arm 360L, and a left spring 362L. Each front lifting bracket assembly 356R, 356L includes a spring anchor 382R, 382L.

Each of the lifting brackets 356R, 356L, 358R, 358L is pinned to the associated synchronizing arm 360R, 360L. The front lifting bracket assemblies 356R, 356L are rigidly coupled to the respective right and left ends of the front pivot shaft 340, such that the right and left lift assemblies 346, 348 actuate together. The parts of the right and left lift assemblies 346, 348 may be called movable components of the deck lift assembly 122. Pivoting of any one of the lifting brackets 356R, 356L, 358R, 358L causes all other lifting brackets to pivot, and prevention of any one of the lifting brackets 356R, 356L, 358R, 358L from pivoting prevents the other lifting brackets from pivoting. The lifting brackets 356R, 356L, 358R, 358L are interconnected with the brackets 300 on the cutting deck 280, as for example by chains, such that the cutting deck assembly 118 raises and lowers as the lifting brackets pivot.

The right and left springs 362R, 362L are linear springs having one end connected to the spring anchor 382R, 382L of the associated front lifting bracket assembly 356R, 356L and another end secured to the frame 110. The springs 362 provide a biasing force or torque on the front lifting bracket assemblies 356R, 356L to provide lift assistance for raising the cutting deck assembly 118 up toward the travel position. Other spring arrangements are suitable, including torsion springs acting on any or all of the front, rear, or front and rear lifting bracket assemblies 356R, 356L, 358R, 358L.

The hand actuator assembly 349 includes a hand pivot bracket 410, a lifting link 412, and the deck lift hand lever 206. The hand pivot bracket 410 is pivotally mounted to the control tower 114. The lifting link 412 is pinned at one end to the hand pivot bracket 410 and is pinned at the opposite end to the actuation hole 402 of the right rear lifting bracket assembly 358R. The deck lift hand lever 206 is rigidly affixed, as by welding or with two fasteners, to the hand pivot bracket 410.

The deck lift hand lever 206 is within the operator zone. Upon grasping the deck lift hand lever 206 and pulling it rearward, an operator pivots the hand pivot bracket 410, which lifts the lifting link 412. The lifting link 412 actuates the right lift assembly 346 through the right rear lifting bracket assembly 358R by pivoting the right rear lifting bracket assembly 358R in a first direction, which may also be called the raising direction. This causes the other lifting brackets 356R, 356L, 358L to pivot in the first or raising direction, and results in the cutting deck assembly 118 raising. Upon release of the lever 206, the deck lowers under the influence of gravity, causing the bracket assemblies 358R, 356R, 356L, 358L to pivot in a second direction, which can be referred to as the lowering direction.

Figure 12:
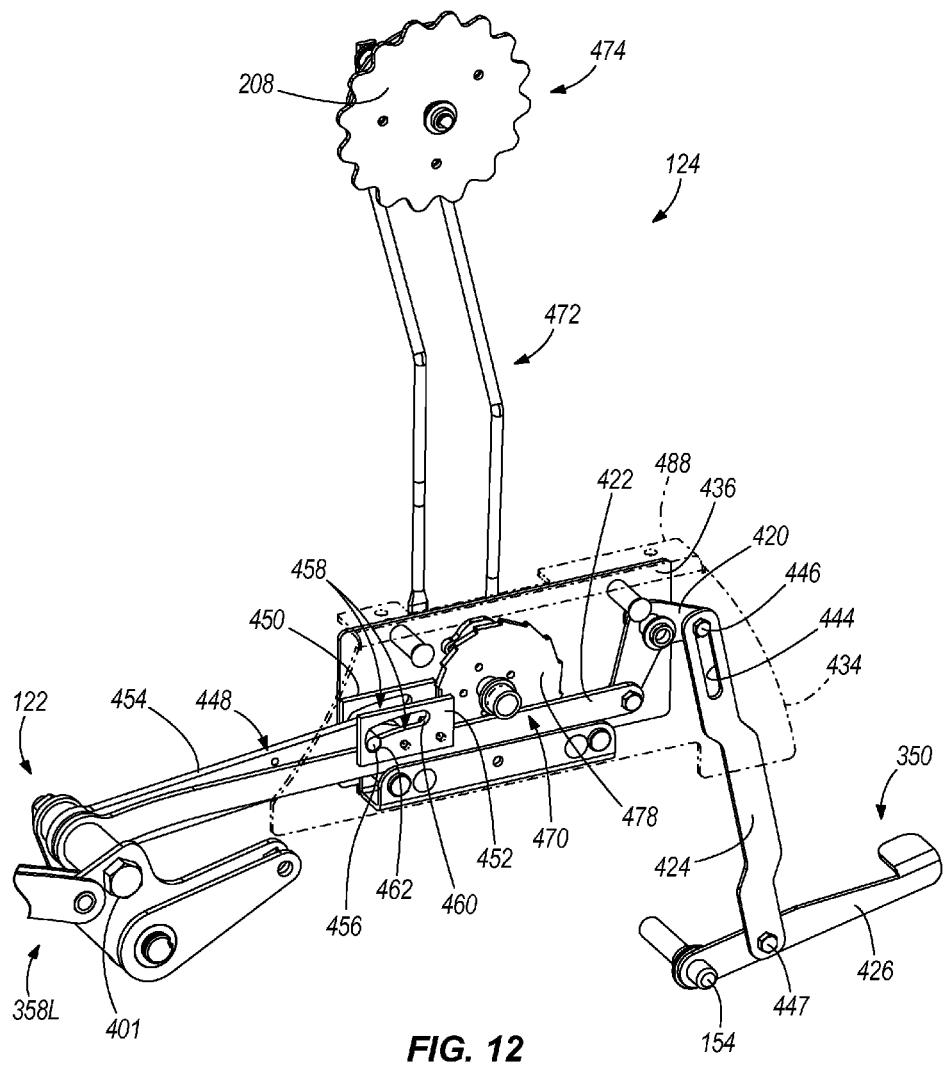
FIG. 12 is a perspective view of a portion of the height-of-cut assembly.

With additional reference to FIG. 12, the foot actuator assembly 350 includes a foot pivot bracket 420, a push link 422, a slotted arm 424, and a deck lift foot lever 426. The foot pivot bracket 420 is pivotally mounted to the control tower 114 between a left plate 434 and a right plate 436 that are positioned in the left side of the control tower 114. The left and right plates 434, 436 are supported by a U-shaped member that is mounted to their lower edges. The push link 422 is pinned at one end to the foot pivot bracket 420 and is interconnected with a pin 401 at the opposite end to the left rear lifting bracket assembly 358L.

The slotted arm 424 includes an upper end and a lower end. The upper end includes an elongated slot 444. A pin 446 rigidly affixed to the foot pivot bracket 420 is captured in the elongated slot 444. The lower end of the slotted arm 424 is pivotally interconnected to the deck lift foot lever 426 with a fastener 447 between the opposite ends of the deck lift foot lever 426. The fastener 447 acts as a pivot pin, and is received within the arc-shaped slot 183 discussed above. One end of the deck lift foot lever 426 is pivotally interconnected to the pivot pin 154 of the left pivot assembly 134 of the operator platform assembly 112. The deck lift foot lever 426 is within the operator zone and pivots about the same pivot axis (i.e., that defined by pivot pin 154) as the operator platform 130.

The deck lift foot lever 426 can be pivoted up to the storage position (FIG. 6) in which the deck lift foot lever 426 is substantially vertical. As the deck lift foot lever 426 is pivoted about the pin 154 toward the storage position, the slotted arm 424 is lifted a distance not greater than the spacing between the fastener 447 and the pivot pin 154. The fastener 447 moves in the arc-shaped slot 183 as the deck lift foot lever 426 is pivoted. The elongated slot 444 has a length at least equal to the distance between the fastener 447 and the pivot pin 154, and therefore allows the slotted arm 424 to move upward with respect to the pin 446 without having the pin 446 bottom out in the slot 444 as the deck lift foot lever 426 is pivoted into the stored position. The elongated slot 444 may therefore be said to permit lost motion between the slotted arm 424 and the pin 446 as the deck lift foot lever 426 is pivoted into the stored position and back down to the operational position.

In some embodiments, the platform 130 and slotted arm 424 pivot together into the stored and operational positions (i.e., if one is pivoted the other pivots with it) and in other embodiments one or both of the platform 130 and slotted arm 424 are pivotable into the stored position while the other remains in the operational position or pivotable into the operational position while the other remains in the stored position. In still other embodiments, the deck lift foot lever 426 pivots about an axis different than the axis defined by the pivot pin 154.

As the deck lift foot lever 426 pivots down under the influence of a downward force (i.e., the operator stepping down on it), the slotted arm 424 is pulled down. The top end of the slot 444 in the upper end of the slotted arm 424 engages the pin 446 on the foot pivot bracket 420 and causes the foot pivot bracket 420 to pivot. In response to pivoting of the foot pivot bracket 420, the push link 422 is moved linearly, generally forward. The forward linear motion of the push link 422 pivots the left rear lifting bracket assembly 358L in the first direction through the pin 401 interconnection. The other lifting brackets 356L, 356R, 358R pivot in unison in the first direction with the left rear lifting bracket 358L, which lifts the cutting deck 280. Upon removing the downward force from the deck lift foot lever 426, the deck lowers under the influence of gravity, causing the bracket assemblies 358R, 356R, 356L, 358L to pivot in the second direction.

The cutting deck lift assembly 122 also includes a cutting deck prop assembly 448. The cutting deck prop assembly 448 includes a right prop bracket 450, a left prop bracket 452, a deck prop 454, and a transverse pin 456. The right prop bracket 450 is mounted to the right plate 436 on the left side of the control tower 114 and the left prop bracket 452 is mounted to the left plate 434. Each of the prop brackets 450, 452 includes a slot 458 having a straight portion 460 (which may also be referred to as the "height-of-cut zone" of the slot) and a hook or undercut 462 front end (which may also be referred to as the "travel zone" of the slot 458). The deck prop 454 includes first and second opposite ends. The first end of the deck prop 454 is pivotally interconnected to the left rear lifting bracket assembly 358L with the pin 401 that pivotally couples the push link 422 to the left rear lifting bracket assembly 358L. The second end of the deck prop 454 includes a hole through which extends the transverse pin 456. The right and left ends of the transverse pin 456 ride in the slots 458 in the respective right and left prop brackets 450, 452.

As the cutting deck 280 raises, the deck prop 454 is moved linearly forward, which moves the transverse pin 456 forward in the height of cut portion 460 of the slots 458. When the deck 280 achieves the travel position (i.e., full up), the pin 456 is received in the hook or undercut 462 in the forward end of the slot 458 in each of the right and left prop brackets 450, 452. The deck 280 is maintained in the travel position by engagement of the transverse pin 456 in the undercuts 462. The weight of the deck 280 applies a linear, compressive load to the deck prop 454, which results in a line of force applied by the transverse pin 456 on the undercuts 462. The geometry of the undercuts 462 and the direction of the line of force maintains the transverse pin 456 in the undercuts 462. The deck 280 is therefore propped by this mechanical interconnection in the travel position until the operator desires to lower the cutting deck 280.

The transverse pin 456 may be removed from the undercuts 462 with a "kicker" release, or other linkage that moves the transverse pin 456 out of the travel zone and into the height-of-cut zone 460 of the slots 458.

The height-of-cut assembly 124 includes a height setting cam assembly 470, a height setting linkage 472, and a height setting operator interface 474.

The height setting cam assembly 470 includes a cam 478. The periphery of the cam 478 defines a plurality of height-of-cut stop surfaces arranged along a cam profile. The stop surfaces vary in radial distance from the axis of rotation of the cam 478. The stop surface that is positioned at the front of the cam 478 is generally vertically oriented and is configured to be engaged by the second end of the deck prop 454. The stop surface in this position may be said to be in the "engagement position." The deck prop 454 prevents the cutting deck assembly 118 from lowering with respect to the frame 110 beyond the point at which the deck prop 454 engages the stop surface in the engagement position.

The left plate 434 includes a flange that includes a cut-out to accommodate the height setting linkage 472. The height setting linkage 472 interconnects the height setting cam assembly 470 with the height setting operator interface 474.

The height setting operator interface 474 includes the height of cut selector 208. By rotating or dialing the height of cut selector 208 from the operator zone, the operator rotates the cam 478 (through the height setting linkage 472) to change the stop surface that is in the engagement position, and thus changes the height of cut setting for the mower.

More specifically, to adjust the height of cut setting of the lawn mower 100, one of the deck lift hand lever 206 and deck lift foot lever 426 is actuated to raise the cutting deck 280 slightly. As the rear-left lifting bracket 358L pivots, the deck prop 454 is pulled forward and disengaged from the stop surface 496 in the engagement position. With the deck prop 454 out of engagement with the cam 478, the operator rotates the height of cut selector 208. The geometry of the height setting linkage 472 causes the cam 478 to rotate, which positions a different cam stop 496 in the engagement position. The new cutting height set point is indicated by the cutting height indicator 209 on the operator console on top of the tower 114. The operator can therefore "dial in" a desired height of cut from the operator zone while the mower is in use.

After the user has rotated the height of cut selector 208 to the desired cutting height set point, the deck lift hand lever 206 or the deck lift foot lever 426 (whichever was actuated) is released and the cutting deck 280 lowers under the influence of gravity until the deck prop 454 engages the stop surface 496 in the engagement position. In this regard, the deck prop 454 may be considered part of the cutting deck lift assembly 122 and the height-of-cut assembly 124.

Various features of the invention are set forth in the following claims.

What is claimed is:

1. A standing lawn mower comprising:
a plurality of wheels;
a frame supported by the wheels;
an operator support platform supporting a standing operator of the lawn mower;
a mower drive assembly supported by the frame and driving rotation of at least one of the wheels to propel the lawn mower;
a cutting deck assembly including a cutting deck and at least one rotatable cutting blade beneath the cutting deck, the rotatable cutting blade rotating under the influence of the mower drive assembly;
a cutting deck lift assembly actuable to raise and lower the cutting deck assembly, the cutting deck lift assembly including a deck lift foot lever; and
wherein the deck lift foot lever is positioned near the operator platform and configured for actuation by a foot of the standing operator.

2. The lawn mower of claim 1, wherein the operator platform includes a central flat surface and angled side sections.

3. The lawn mower of claim 2, wherein the angled side sections extend up at an angle of between about 0° and 80° with respect to the central flat surface.

4. The lawn mower of claim 1, further comprising an operator platform assembly that includes the operator platform, a right pivot assembly, and a left pivot assembly; wherein the operator platform pivots about the right and left pivot assemblies between an operating position and a stored position.

5. The lawn mower of claim 4, wherein the right and left pivot assemblies each includes a pivot sleeve and a pivot pin; wherein the pivot sleeves are cylindrical with a through bore; wherein the operator platform assembly further includes pair of ears extending up from each of the right and left sides of the operator platform; wherein each ear includes a centering hole; wherein the pivot sleeves are positioned between the pairs of ears with the through bores aligned with the centering holes; and wherein the pivot pin extends through the centering holes and the through bore.

6. The lawn mower of claim 5, further comprising bushings received in each end of the through bores, and securing the pivot sleeves to the ears; wherein the pivot pins extend through the bushings.

7. The lawn mower of claim 4, wherein the pivot assemblies further comprise a right side yoke and a left side yoke, both of which are rigidly mounted to the frame; and wherein the pivot pins extend through mounting holes in the yokes to pivotably secure the foot platform to the frame.

8. The lawn mower of claim 7, wherein the deck lift foot lever and operator platform are pivotable about a common pivot axis.

9. The lawn mower of claim 8, wherein the cutting deck lifting assembly includes an arm pivotably interconnected at one end to the deck lift foot lever with a pivot member, and pivotably interconnected at an opposite end to a foot pivot bracket; wherein at least one of the yokes includes a plate having an arcuate slot; and wherein a pivot member is movable within an arcuate slot as the deck lift foot lever and operator platform are pivoted about the common pivot axis.

10. The lawn mower of claim 4, wherein the foot platform assembly further includes a pivot limiting assembly that includes a stop plate and a rear cross bar; wherein the stop plate extends up from the foot platform; wherein the rear cross bar is rigidly interconnected with the frame; and wherein the stop plate abuts the rear cross bar when the operator platform is in the operating position, to resist rotation of the operator platform down from the operating position.

11. The lawn mower of claim 10, wherein the stop plate includes dampening members that abut the rear cross member; wherein the dampening members are made of a resilient material to absorb dynamic stresses and vibrations during operation of the lawn mower to improve the comfort of the operator.

12. The lawn mower of claim 10, wherein the mower drive assembly includes right and left integrated transaxles for driving rotation of respective right and left drive wheels; and wherein the stop plate passes between the right and left integrated transaxles as the foot platform is pivoted between the operating position and the stored position.

13. The lawn mower of claim 4, wherein the foot platform assembly further includes a latching assembly to retain the foot platform in the stored position.

14. The lawn mower of claim 13, wherein the latch assembly includes a latch pin on the foot platform, a latch arm interconnected to the frame, and a biasing member; and wherein the latch pin is engaged by the latch arm to retain the foot platform in the stored position.

15. The lawn mower of claim 14, wherein the latch arm includes a cam surface and a latch slot; wherein the latch pin engages the cam surface and deflects the latch arm as the foot platform is pivoted into the stored position; wherein the biasing member moves the latch pin into the latch slot upon the latch pin becoming aligned with the latch slot; and wherein positioning of the latch pin in the latch slot prevents the foot platform from pivoting out of the stored position.

16. An operator support platform assembly for a standing lawn mower, the operator support platform assembly supporting a standing operator of the lawn mower when the operator platform is in an operating position, the operator support platform assembly comprising:
- a right pivot assembly;
- a left pivot assembly;
- an operator platform pivoting on the right and left pivot assemblies between the operating position and a stored position; and
- a deck lift foot lever mounted adjacent the operator platform and pivotable about a pivot axis between an operating position and a stored position, the deck lift foot lever being actuated by a foot of the operator standing on the operator platform to raise the height of a cutting deck of the lawn mower.

17. The operator support platform assembly of claim 16, wherein the right and left pivot assemblies each include a pivot pin; and wherein the deck lift foot lever pivots about one of the pins.

18. The operator support platform assembly of claim 16, further comprising a pivot limiting assembly that includes a stop plate and a rear cross bar; wherein the stop plate extends up from the foot platform; wherein the rear cross bar is rigidly interconnected with a frame of the lawn mower; and wherein the stop plate abuts the rear cross bar when the operator platform is in the operating position, to resist rotation of the operator platform down from the operating position.

19. The operator support platform assembly of claim 18, wherein the stop plate includes at least one dampening member that abuts the rear cross member; wherein the dampening member is made of a resilient material to absorb dynamic stresses and vibrations during operation of the lawn mower to improve the comfort of the operator.

20. The operator support platform assembly of claim 18, wherein the lawn mower includes right and left integrated transaxles for driving rotation of respective right and left drive wheels; and wherein the stop plate passes between the right and left integrated transaxles as the foot platform is pivoted between the operating position and the stored position.

21. The operator support platform assembly of claim 16, further comprising a latch assembly including a biasing member, a latch arm including a latch slot, and a latch pin; wherein movement of the operator platform into the stored position brings the latch pin into abutment with the latch arm; wherein the latch pin deflects the latch arm against a biasing force in the biasing member; wherein the biasing member moves the latch pin into the latch slot upon the latch pin becoming aligned with the latch slot; and wherein positioning of the latch pin in the latch slot prevents the foot platform from pivoting out of the stored position.

22. An operator support platform assembly for a standing lawn mower, the operator support platform assembly supporting a standing operator of the lawn mower when the operator platform is in an operating position, the operator support platform assembly comprising:
- a right pivot assembly;
- a left pivot assembly;
- an operator platform pivoting on the right and left pivot assemblies between the operating position and a stored position; and
- a deck lift foot lever mounted adjacent the operator platform and pivotable about a pivot axis between an operating position and a stored position, the deck lift foot lever being actuated by a foot of the operator standing on the operator platform to raise the height of a cutting deck of the lawn mower;

wherein the operator platform pivots about the pivot axis.

\* \* \* \* \*